(12) United States Patent
Shigetomi

(10) Patent No.: US 9,738,254 B2
(45) Date of Patent: Aug. 22, 2017

(54) TIRE THEFT ALARM SYSTEM

(71) Applicant: DENSO CORPORATION, Kariya, Aichi-pref. (JP)

(72) Inventor: Ichiro Shigetomi, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/651,470

(22) PCT Filed: Nov. 26, 2013

(86) PCT No.: PCT/JP2013/006923
§ 371 (c)(1),
(2) Date: Jun. 11, 2015

(87) PCT Pub. No.: WO2014/091692
PCT Pub. Date: Jun. 19, 2014

(65) Prior Publication Data
US 2015/0314752 A1    Nov. 5, 2015

(30) Foreign Application Priority Data

Dec. 13, 2012    (JP) .................................. 2012-272445

(51) Int. Cl.
*B60R 25/102*    (2013.01)
*B60R 25/10*    (2013.01)
(Continued)

(52) U.S. Cl.
CPC ........ *B60R 25/102* (2013.01); *B60C 23/0418* (2013.01); *B60C 23/0437* (2013.01);
(Continued)

(58) Field of Classification Search
CPC ........... B60C 23/0418; B60C 23/0437; B60C 23/0408; B60C 23/0444; B60R 25/1004; B60R 25/104; G01V 1/008
(Continued)

(56) References Cited

U.S. PATENT DOCUMENTS 7,026,953 B2 *    4/2006   Fujii ................... B60C 23/0444
                                                             340/444
2004/0217849 A1 *   11/2004  Maehara ............ B60R 21/0132
                                                             340/426.1
(Continued)

FOREIGN PATENT DOCUMENTS

CN    201685785 U    12/2010
JP    2001088661 A    4/2001
(Continued)

OTHER PUBLICATIONS

International Search Report and Written Opinion (in Japanese with English Translation) for PCT/JP2013/006923, mailed Feb. 25, 2014; ISA/JP.

*Primary Examiner* — Mirza Alam
(74) *Attorney, Agent, or Firm* — Harness, Dickey & Pierce, P.L.C.

(57) ABSTRACT

A tire theft alarming system includes a vehicular device mounted to a vehicle and a mobile device carried by a user of the vehicle. When a main power supply of the vehicle is in an OFF state, the vehicular device transmits a radio wave including a first alarm based on having a variation in air pressure or acceleration of a tire, which is mounted to the vehicle, detected by a sensor transmitter for detecting and transmitting the air pressure of the tire or the acceleration applied to the tire. The mobile device carries out a warning notification to a user based on having reception of a radio wave including a first alarm transmitted by the vehicular device.

7 Claims, 9 Drawing Sheets

(51) Int. Cl.
    *B60C 23/04*        (2006.01)
    *B60R 25/34*        (2013.01)
(52) U.S. Cl.
    CPC ...... *B60C 23/0479* (2013.01); *B60C 23/0488*
            (2013.01); *B60R 25/1001* (2013.01); ***B60R
            25/34*** (2013.01)
(58) Field of Classification Search
    USPC .................................................. 340/426.18
    See application file for complete search history.

(56)            References Cited
            U.S. PATENT DOCUMENTS

| 2004/0246111 | A1  | 12/2004 | Oyagi et al. |
| 2006/0244577 | A1* | 11/2006 | Tanaka ................ B60R 25/1004 |
| | | | 340/429 |
| 2007/0075847 | A1* | 4/2007  | Oyagi ................ B60R 25/1004 |
| | | | 340/426.1 |
| 2007/0096884 | A1  | 5/2007  | Takashima et al. |
| 2009/0085732 | A1* | 4/2009  | Gila ..................... G08B 13/149 |
| | | | 340/426.33 |
| 2009/0102634 | A1  | 4/2009  | Okada et al. |
| 2012/0126967 | A1* | 5/2012  | McCormick ........ B60C 23/0408 |
| | | | 340/445 |

FOREIGN PATENT DOCUMENTS

| JP | 2003-063356    | 3/2003  |
| JP | 2006-076320    | 3/2006  |
| JP | 2006-347298    | 12/2006 |
| JP | 2007083911 A   | 4/2007  |
| JP | 4144521 B2     | 9/2008  |
| JP | 2009097272 A   | 5/2009  |
| JP | 2009-248959    | 10/2009 |
| JP | 2010228486 A   | 10/2010 |
| JP | 4635906 B2     | 2/2011  |
| JP | 2012-168714    | 9/2012  |
| JP | 2012-171470    | 9/2012  |
| JP | S62001658 A    | 1/2015  |

\* cited by examiner

TIRE THEFT ALARM SYSTEM

CROSS REFERENCE TO RELATED APPLICATIONS

This application is a U.S. National Phase Application under 35 U.S.C. 371 of International Application No. PCT/JP2013/006923 filed on Nov. 26, 2013 and published in Japanese as WO 2014/091692 A1 on Jun. 19, 2014. This application is based on and claims the benefit of priority from Japanese Patent Application No. 2012-272445 filed on Dec. 13, 2012. The entire disclosures of all of the above applications are incorporated herein by reference.

TECHNICAL FIELD

The present disclosure relates to a tire theft alarm system.

BACKGROUND ART

The techniques for providing notification of theft of a tire mounted to a vehicle have been recently known. For example, Patent Document 1 discloses the technique in which a vehicle generates an alarm by sound and light when detecting a change in air pressure of a tire at the time of removing the tire from the vehicle.

PRIOR ART LITERATURES

Patent Literature

Patent Literature 1: JP-2007-83911 A

SUMMARY OF INVENTION

However, the technique using light and sound as described above may not be effective for notifying of an abnormality to a user when the distance between a vehicle's parking position and the user's position (for example, residence) is longer.

It is an object of the present disclosure to provide a technique configured to notify of theft of a tire to a user even if a vehicle generates an alarm by sound and light that is difficult to reach the user.

According to first aspect of the present disclosure, a tire theft alarming system includes a vehicular device mounted to a vehicle and a mobile device carried by a user of the vehicle. When a main power supply of the vehicle is in an OFF state, the vehicular device transmits a radio wave having a first warning based on a variation in air pressure or acceleration of a tire detected by a sensor transmitter for detecting and transmitting air pressure of the tire mounted to the vehicle or acceleration applied to the tire. The mobile device performs a warning notification to the user based on receiving a radio wave including the first alarm transmitted by the vehicular device.

In this way, when the main power supply is in an OFF state, the vehicular device transmits a first alarm by a radio wave based on a variation in air pressure or acceleration of a tire, and the mobile device receives the radio wave and performs a warning notification for a user. Accordingly, since the first alarm is notified to the mobile device from the vehicular device through a radio wave, tire theft is notified to the user even if the vehicle generates an alarm through sound and light that is difficult to reach the user.

According to this tire theft alarming system, the vehicular device may include: a TPMS vehicular device that controls display in response to air pressure of the tire received from the sensor transmitters when the main power supply is in an ON state and stops an operation when the main power supply is in an OFF state; and a door-control vehicular device that controls door-locking and door-unlocking for the vehicle by at least making communication with the mobile device when the main power supply is in an OFF state. In this situation, the sensor transmitter transmits detected air pressure of the tire to the TPMS vehicular device when the main power supply is in an ON state, and transmits detected air pressure of the tire to the door-control vehicular device when the main power supply is in an OFF state. The door-control vehicular device transmits the first alarm by the radio wave to the mobile device based on a variation in air pressure of the tire received from the sensor transmitter when the main power supply is in an OFF state.

In this way, since the first alarm can be transmitted to the mobile device with the use of the door-control vehicular device operated at a time of at least travelling driven power is in an OFF state, the necessity for operating the TPMS vehicular device when the travelling driven power is in an OFF state can be eliminated. Accordingly, for the TPMS vehicular device assumed to be operated during travelling and not designed for minimizing power consumption, it is not required to elongate operation time for warning tire theft, and restricting power consumption for a vehicle can be achieved.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION (Embodiment 1)

Figure 1:
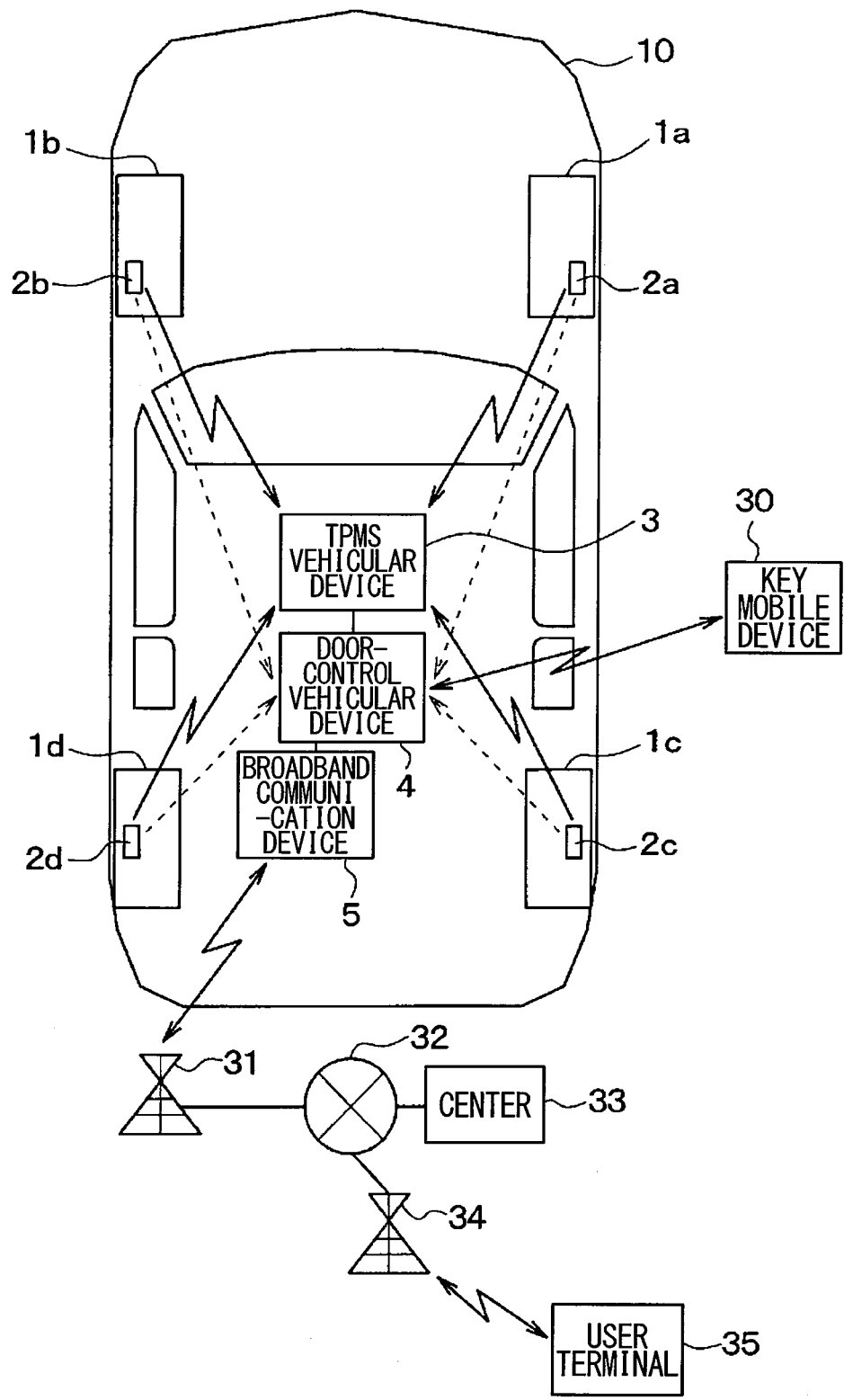
FIG. 1 It is a diagram that shows the configuration of a tire theft alarm system according to Embodiment 1 in the present disclosure.

The following describes Embodiment 1 of the present disclosure. As illustrated in FIG. 1, a tire theft alarming system according to the present embodiment includes: sensor transmitters 2a through 2d, each of which is individually mounted on a plurality of tires 1a through 1d mounted to a vehicle 10 travelling with power of an engine as an internal combustion engine; a TPMS (tire pressure monitoring system) vehicular device 3 mounted on a vehicle body of the vehicle 10; a door-control vehicular device 4; a broadband communication device 5; and a key mobile device 10 carried by a user who uses the vehicle 10.

Each of the sensor transmitters 2a through 2d is always in operation regardless of IG of a vehicle being in an ON state or an OFF state (i.e., the main power supply of the vehicle being in an ON state or an OFF state). Subsequently, the air pressure of the tires 1a through 1d, on which the sensor transmitters 2a through 2d are individually mounted, and the acceleration of the tires (for example, the acceleration of the tires in a radial direction) caused by, for example, vibration or rotation of the tires are detected, and the latest detection value (i.e., air pressure and acceleration) is wirelessly transmitted periodically.

Figure 2:
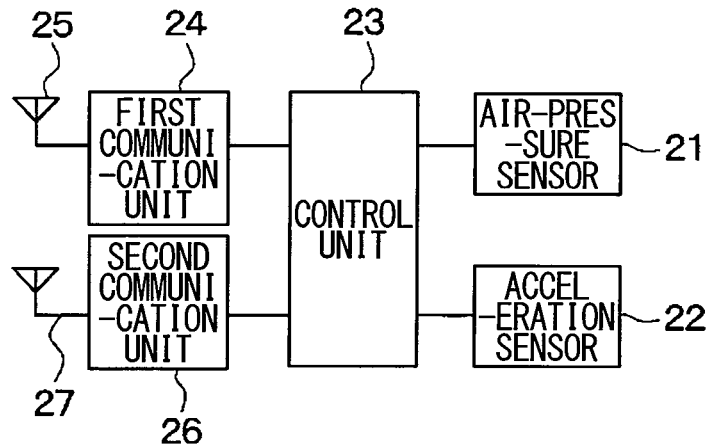
FIG. 2 It is a diagram that the configuration of a sensor transmitter.

More specifically, as shown in FIG. 2, each of the sensor transmitters 2a through 2d includes an air-pressure sensor 21, an acceleration sensor 22, a control unit 23, a first communication unit 24, a first antenna 25, a second communication unit 26, and a second antenna 27. Each of members 21 through 27 is driven by power feeding from a battery (not shown) arranged in the sensor transmitter.

The pressure sensor 21 is configured by, for example, a diaphragm type pressure sensor, and outputs a detection signal in response to air pressure of a tire to be mounted.

The acceleration sensor 22 is used for detecting acceleration of a tire (i.e., moving acceleration, rotational acceleration and gravity acceleration) caused by, for example, vibration and rotation of the tire to be mounted, and outputs a detection signal in response to, for example, acceleration of the tire in a radial direction when a wheel is in rotation.

The control unit 23 is a micro-computer including, for example, a CPU and a memory, and executes predetermined processing in response to a program stored in the memory. In particular, the control unit 23 periodically obtains the information of tire inflation pressure based on a detection signal outputted from the air-pressure sensor 21, and periodically obtains the information of acceleration based on a detection signal outputted from the acceleration sensor 22, and then stores the information of tire inflation pressure and acceleration into a frame and transmits the frame at a predetermined periodic timing. The transmission destination may be the TPM vehicular device 3 or the door-control vehicular device 4.

The first communication unit 24 is a wireless communication circuit that carries out processing such as amplification or modulation on a frame to be transmitted and transmits a signal corresponding to the result of processing to the first antenna 25. The second communication unit 26 is a wireless transmission circuit that carries out processing such as amplification or modulation on a frame to be transmitted and transmits a signal corresponding to the result of processing to the second antenna 27.

The first communication unit 24 and the first antenna 25 are configured to transmit a frame to the TPMS vehicular device 3. The second communication unit 26 and the second antenna 27 are configured to transmit a frame to the door-control vehicular device 4.

When the control unit 23 outputs a frame to the first communication unit 24, the first communication unit 24 transmits the frame as a signal corresponding to a frequency (for example, 314.98 MHz), a modulation method (for example, FSK) and a data rate (for example, several tens of kbps), for which the TPMS vehicular device 3 can receive, to the first antenna 25.

In addition, when the control unit 23 outputs a frame to the second communication unit 26, the second communication unit 26 transmits the frame as a signal corresponding to a frequency (for example, 314.35 MHz), a modulation method (for example, it may be FSK or ASK) and a data rate (for example, several kbps), for which the door-control vehicular device 4 can receive, to the second antenna 27.

The first communication unit 24 demodulates a signal (e.g., a signal regarding notification of IG in an OFF state), which is transmitted from the TPMS vehicular device 3 and received by the first antenna 25, and also has a function for outputting data corresponding to the result of processing to the control unit 23.

When the first antenna 25 and the second antenna 27 are able to cover both of the frequency, for which the TPMS vehicular device 3 can receive, and the frequency, for which the door-control vehicular device 4 can receive, two antennas may be integrated into one.

The TPMS vehicular device 3 is mounted to the body of the vehicle 10, and controls a display (e.g., display of air pressure and acceleration on a meter) in response to air pressure and acceleration of a tire received wirelessly from the sensor transmitters 2a through 2d during operation. It is noted that the TPMS vehicular device 3 according to the present embodiment includes a wireless transmission unit for transmitting notification of IG in an OFF state to the sensor transmitters 2a through 2d.

The door-control vehicular device 4 is in operation regardless of IG being in an ON state or an OFF state, and controls locking and unlocking of a door for the vehicle 10 by making communication with the key mobile device 30 during an operation. For example, the door is locked when receiving a door-locking signal from the key mobile device 30, whereas the door is unlocked when receiving a door-unlocking signal from the key mobile device 30. Additionally, the door-control vehicular device 4 transmits a request signal to the key mobile device 30, and receives an answer signal from the key mobile device 30 as a response to the request signal. Moreover, the door may be unlocked when a user touches a doorknob.

It is noted that the door-locking signal is a signal which is transmitted by the key mobile device 30 based on a predetermined door-locking operation performed by a user on the key mobile device 30. In addition, the door-unlocking signal is a signal which is transmitted by the key mobile device 30 based on a predetermined door-unlocking operation performed by a user on the key mobile device 30.

The door-control vehicular device 4 according to the present embodiment includes a wireless transmission unit for transmitting a first alarm to the key mobile device 30.

The broadband communication device 5 is a wireless communication unit for making communication with a transmission destination which is relatively farther than the transmission range of the first alarming notification, and is in operation regardless of IG being in an ON state and an OFF state. In particular, the broadband communication device 5 communicates with a center 33 (corresponding to one example of the transmission destination), which is connected to a communication network 32 (such as a cellular network or internet), by means of making wireless connection with a wireless base station 31 connected to the communication network 32. In addition, the broadband communication device 5 communications with a user terminal 35 (corresponding to an example of the transmission destination) such as a smartphone through another wireless base station 34 connected to the communication network 32.

It is noted that the user terminal 35 is a terminal carried by a user of the vehicle 10, and the user terminal 35 may be a terminal different from the key mobile device 30. The broadband communication device 5 may use a well-known DCM (Data Communication Module). In addition, the wireless communication range (for example, within a radius of 5 kilometers centering at the door-control vehicular device 4) of the broadband communication device 5 is further broader than the transmission range (for example, within a radius of 30 meters centering at the door-control vehicular device 4) of the first alarm generated by the door-control vehicular device 4.

The key mobile device 30, which is carried by a user of the vehicle 10, makes communication with the door-control vehicular device 4. The door-control vehicular device 4 controls locking and unlocking of a door of the vehicle 10 through the communication as described above. The key mobile device 30 may be a well-known smart key (i.e., the key used for a smart entry) or a well-known RKE key (i.e., the key used for a keyless entry).

The following describes the operation of the tire theft alarm system configured as above. The TPM vehicular device 3 is configured to execute processing for a display in response to air pressure and acceleration of the tire and processing indicated in FIG. 3 simultaneously, as the processing configured to transmit notification of IG in an OFF state to the sensor transmitters 2a through 2d and stop consequently.

Figure 3:
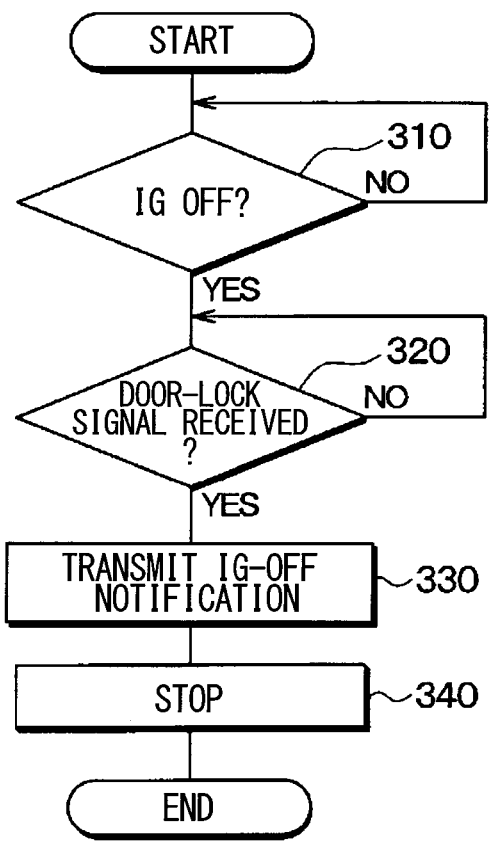
FIG. 3 It is a flowchart that shows processing executed by a TPMS vehicular device.
Figure 4:
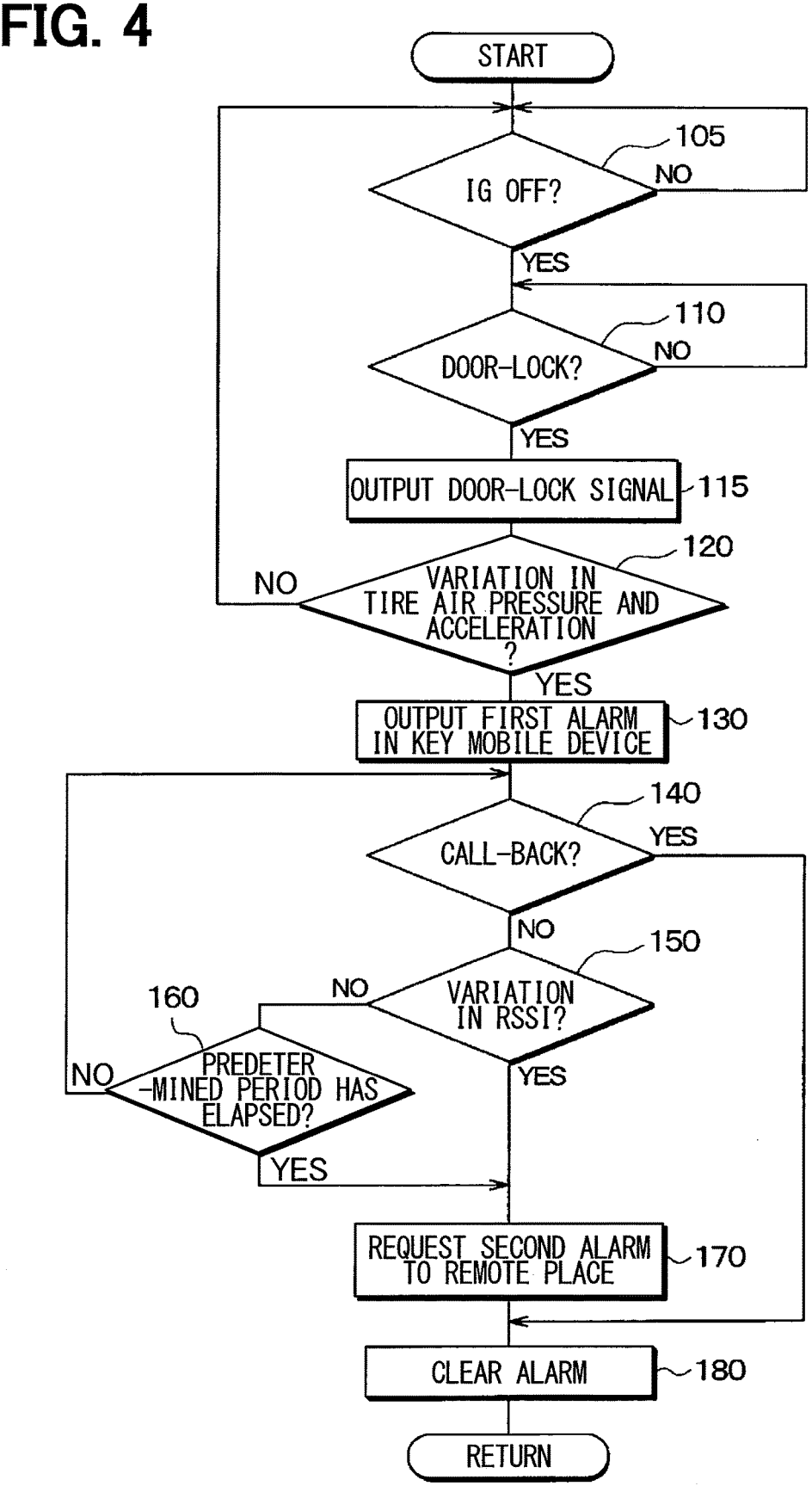
FIG. 4 It is a flowchart that shows processing executed by a door-control vehicular device according to the Embodiment 1.

The door-control vehicular device 4 executes processing illustrated in FIG. 4 when IG is in ON and OFF states. First, the operation from IG being in an OFF state until an alarm notification issued by the mobile device 30 is described with reference to FIGS. 3, 4 and 5.

Figure 5:
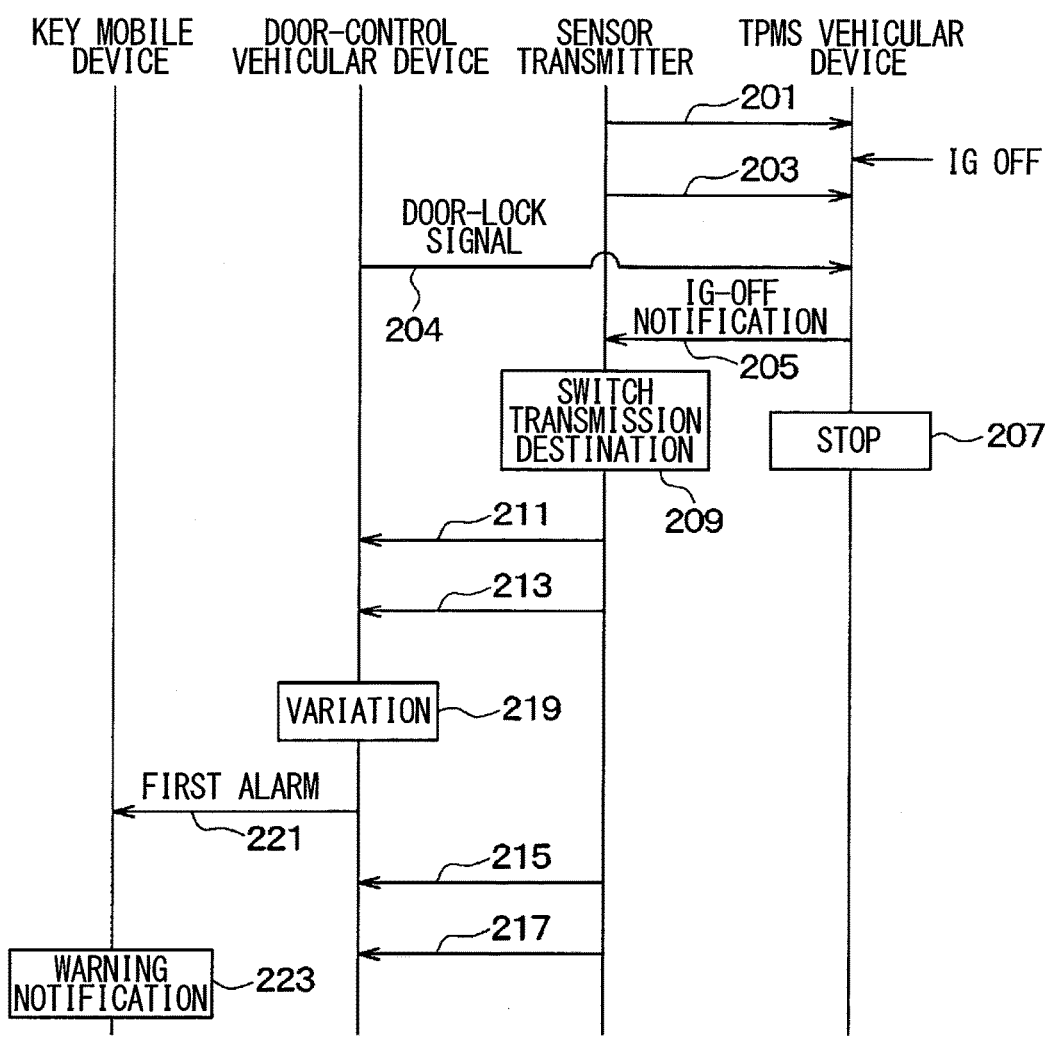
FIG. 5 It is a sequence diagram that shows an operation performed by the tire theft alarm system.
Figure 7:
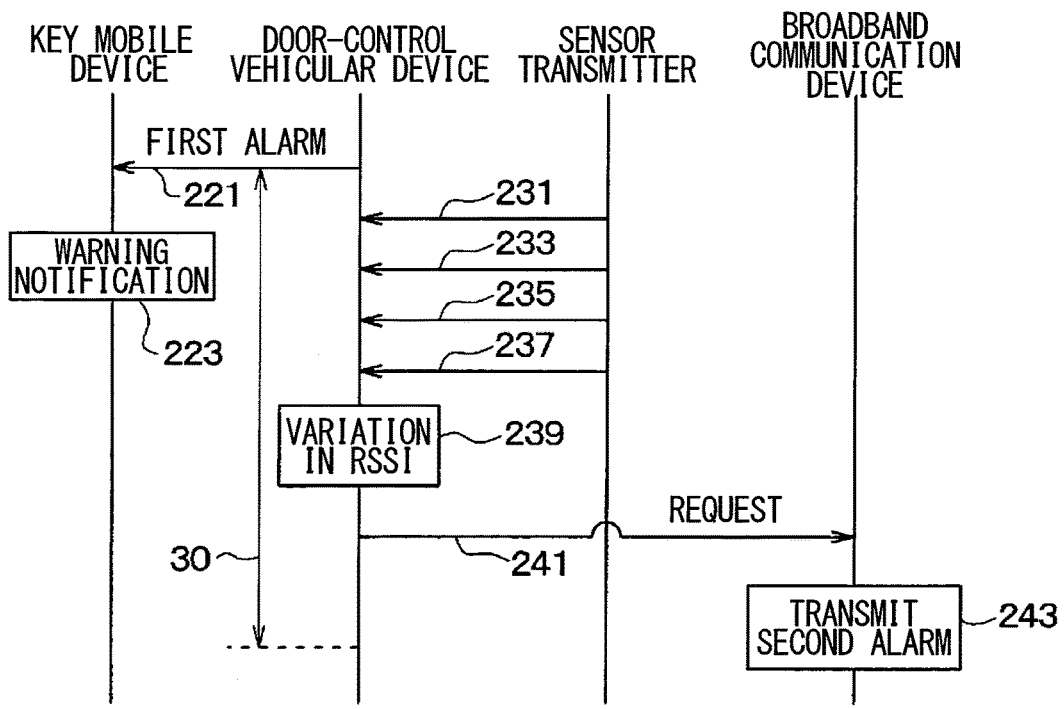
FIG. 7 It is a sequence diagram that shows the operation performed by the tire theft alarm system.

The sensor transmitters 2a through 2d detects air pressure and acceleration of the tires 1a through 1d to be mounted during IG in an ON state, and periodically transmit signals indicative of latest detection values (i.e., air pressure and acceleration). Although FIGS. 5 and 7 illustrate only one of the sensor transmitters 2a through 2d for simplicity, the operation of other sensor transmitters is basically identical.

The TPMS vehicular device 3 performs display control (for example, control for displaying air pressure and acceleration of each tire on a meter) of, for example, air pressure of each of the tires 1a through 1d based on a received signal (i.e., a signal 201 or the like) corresponding to air pressure and acceleration of the tire.

The TPMS vehicular device 3 at this time determines that IG is not in an OFF state (i.e., in an ON state) in Step 310 based on a voltage of an IG signal line (not shown) in processing illustrated in FIG. 3, and consequently repeats determination processing in Step 105.

The door-control vehicular device 4 at this time determines that IG is not in an ON state based on a voltage of an IG signal line (not shown) in Step 105, and consequently repeats determination processing in Step 105.

When IG is in an OFF state, the TPMS vehicular device 3 determines that IG is in an off state in Step 310 based on a voltage of an IG signal line (not shown) in processing illustrated in FIG. 3 and proceeds the processing to Step 320, and determines that a door-lock signal has not been received and repeats processing in Step 320.

The door-control vehicular device 4 at this time determines that IG is in an OFF state based on a voltage of an IG signal line (not shown) in Step 105 and consequently proceeds to Step 110, processing in Step 110 is repeated when it is determined that the door has not been locked.

In a period from IG in an OFF state until door-locking, similarly to a period where IG is in an ON state, each of the sensor transmitters 2a through 2d individually detects air pressure and acceleration of the tires 1a through 1d to be mounted where IG is in an ON state and periodically transmits a signal 203 indicative of a latest detection value (i.e., air pressure and acceleration). In addition, the TPMS vehicular device 3 carries out display control of, for example, air pressure of the tires 1a through 1d based on a received signal (i.e., the signal 203 or the like) regarding air pressure and acceleration of the tire.

The door of the vehicle 10 is locked after IG is turned into an OFF state. In Step 110, the door-control vehicular device 4 detects that the door is locked, and proceeds to Step 115 after it is determined that the door is locked. In Step 115, the door-locking signal 204 is outputted to the TPMS vehicular device 3 and shifted to a warning state, and processing moves to Step 120.

The TPMS vehicular device 3, which receives the door-locking signal 204, determines that a door-locking signal is received in Step 320 and proceeds to Step 330. In Step 330, a signal regarding notification of IG in an OFF state is transmitted to each of the sensor transmitters 2a through 2d, and subsequently the operation stops (i.e., Step 207 in FIG. 5) in Step 340.

Each of the sensor transmitters 2a through 2d, which receives the signal regarding notification of IG in an OFF state, switches the destination for the detected air pressure and acceleration of a tire from the TPMS vehicular device 3 to the door-control vehicular device 4 by performing transmission destination switching processing (Step 209).

In particular, by means of outputting a frame including information of air pressure and acceleration of a tire, a signal (for example, the signals 201, 203) including the frame is transmitted to the TPMS vehicular device 3 until receiving the signal 205 regarding notification of IG in an OFF state. However, subsequent to receiving the signal 205 regarding notification of IG in an OFF state, the output destination of a frame including information of air pressure and acceleration of a tire is switched from the first communication unit 24 to the second communication unit 25.

Accordingly, subsequent to receiving the notification of IG in an OFF state, the second communication unit 25 wirelessly transmits the signal regarding the frame (for example, the after-mentioned signals 211, 213, 215, 217) to the door-control vehicular device 4 but not the TPMS vehicular device 3.

Additionally, the content of a frame to be outputted is also switched depending on which of the first communication unit 24 and the second communication unit 25 is an output for the frame. Specifically, when a frame is outputted to the first communication unit 24, the frame is configured by a frame format for the TPMS vehicular device 3 and outputted; and when a frame is outputted to the second communication unit 26, the frame is configured by a frame format for the door-control vehicular device 4 and outputted. It is noted that the frame format for the TPMS vehicular device 3 is different from the door-control vehicular device 4.

The frame format for the door-control vehicular device 4 is configured to be identical to the frame format (hereinafter referred to as a RKE format) concerning a door-locking signal and a door-unlocking signal to be transmitted to the door-control vehicular device 4 from the key mobile device 30. A data region (a region for storing an encrypted code) for the RKE format includes TPMS data (data concerning air pressure, acceleration or the like).

Additionally, the sensor transmitters 2a through 2d include tag information indicative of transmitted data in a key ID region (i.e., a region for storing ID of the key mobile device 30) or the data region. Consequently, the door-control vehicular device 4 determines whether the received frame is from the sensor transmitters 2a through 2d or the key mobile device 30 based on the presence or absence of tag information.

Although the following description is not illustrated in FIG. 5, the TPMS vehicular device 3 restarts the operation when IG is turned into an ON state subsequently, and a signal regarding notification of IG in an ON state (not shown) is transmitted to the sensor transmitters 2a through 2d, and the sensor transmitters 2a through 2d switches the transmission destination of the detected air pressure and acceleration of a tire based on receiving the notification of IG in an ON state.

The operation illustrated in FIG. 5 is continued to be described in the following section. The door-control vehicular device 4 waits for reception of a signal (for example, any one of the signals 211, 213, 215, 217) regarding the frame including the tag information, and determines whether there is a change in both physical quantities (that is, a set of the air pressure and acceleration of a tire) included in the frame such that the change exceeds predetermined criteria subsequent to the reception.

Air-pressure variation reference value for comparing the absolute value of amount of a change in air pressure obtained currently with the previous reference air pressure recorded in advance is adopted as the predetermined criteria regarding air pressure of the tires 1a through 1d. More specifically, the absolute value of the variation amount at the time of removing air from tires for stealing the tires exceeds the air-pressure variation reference value, and the air-pressure variation reference value is configured in advance so that the amount of variation caused by slight load variation such as a cat jumping on a vehicle body does not exceed the air-pressure variation reference value.

The identical air pressure of a tire may be recorded after a definite period of time (i.e., one minute) has been elapsed from stopping an engine in the vehicle 10, and be used as a reference air pressure for each tire. The identical air pressure of a tire (for example, air pressure of the same tire to be included in the initial frame 221 after transmitting the door-locking signal 204) at the time of locking the door may be recorded and used as a reference air pressure for each tire.

An acceleration variation reference value, which is configured to compare the absolute value of variation amount in acceleration obtained at present with a reference acceleration value recorded in advance. More specifically, the acceleration variation reference value is configured in advance to make the absolute value of the variation amount, which is at the time where a nut of a wheel attached by the tire is loosened for stealing the tire, exceed the acceleration variation reference value.

The identical acceleration of a tire may be recorded and used as reference acceleration for each tire after a definite period of time has been elapsed (for example, one minute) from stopping an engine in the vehicle 10. The acceleration of the same tire at the time of door-locking may be recorded and used as reference acceleration for each tire.

When the absolute value regarding difference between air pressure currently received by the door-control vehicular device 4 and the air-pressure reference value is less than or equal to the air-pressure variation reference value, it is determined that there is no variation in Step 120. Additionally, when the absolute value regarding difference acceleration currently received by the door-control vehicular device 4 and the reference acceleration, it is determined that there is no variation in Step S120.

When it is determined that there is no variation, the processing returns to Step 105; however, the present example is at the time of IG in an OFF state and the door being locked, Step 120 is again executed through Steps 105, 110, and 115. Thus, the determination in Steps 105, 110, 115 and 120 is repeated until it is determined that there is variation in Step 120.

When the absolute value regarding difference between air pressure received by the door-control vehicular device 4 at present and the reference air pressure exceeds the air-pressure variation reference value; and the absolute value regarding the difference between acceleration received by the door-control vehicular device 4 and the reference acceleration exceeds the acceleration variation reference value, it is determined that there is a variation in Step 120 (see Step 210 in FIG. 5), and processing is moved to Step 130.

In this way, the determination of having a variation in Step 120 can be explained by the following reason. A thief who steals a tire clamps a brick or the like under the vehicle body so as to not make a vehicle falling down and thus removes air from one of the tires 1a through 1d, then the air pressure of one of the tires rapidly drops down, and subsequently the thief who steals the tire clamps a brick or the like under the vehicle body so as to not make a vehicle falling down and thus loosens a nut of a wheel attached by one of the tires 1a through 1d, then vibration is generated at one of the tires; as a result, the acceleration regarding one of the tires rapidly drops down.

In Step 130, a first alarm 221 is transmitted to the key mobile device 30 through a radio wave (for example, a radio wave in RF band) for notifying of the sign of tire theft to a user. The key mobile device 30 directly receiving the radio wave within the transmission of the first alarm 221 carries out warning notification to a user who carries the key mobile device 30 on the basis of the fact that the first alarm 221 is included in the received radio wave (Step 223). The method of warning notification may be a method that operates a vibration generating device attached to the key mobile device 30; or may be a method that operates a light emitting device attached to the key mobile device 30; or may be a method that operates an audio generating device attached to the key mobile device 30.

In this way, when IG is in an OFF state, the door-control vehicular device 4 transmits the first alarm 221 by a radio wave based on having a variation in the air pressure or acceleration of a tire, and the key mobile device 30 directly receives the radio wave and carries out warning notification to a user. Accordingly, even in a state where the vehicle 10 generates an alarm through audio and light that is difficult to reach a user (for example, the vehicle 10 stops at the entrance hall of the user's house, and the user is in the user's house), since the door-control vehicular device 4 notifies of the first alarm through a radio wave to the key mobile device 30, the tire theft can be notified to the user.

Since the first alarm is transmitted to the key mobile device 30 by using the door-control vehicular device 4 operated even at the time of IG in an OFF state, it is not necessary to operate the TPMS vehicular device 3 at the time of IG in an OFF state. In fact, as described above, the TPMS vehicular device 3 stops the operation right after transmitting IG-OFF notification 205 immediately following the door-locking subsequent to IG turned into an OFF state, and continues to stop operation until IG is turned to an ON state again. Accordingly, for the TPMS vehicular device 3 assumed to be operated at the time of travelling and not designed for minimizing the amount of power consumption, it is not required to extend operation time for warning of tire theft so that the amount of power consumption of the vehicle can be conserved.

The above describes the operation illustrated in FIG. 5. Next, a first operation example in which the key mobile device 30 receives the first alarm 221 and carries out warning notification (Step 223) is described with reference to FIG. 6.

First, the door-control vehicular device 4 proceeds to Step 140 illustrated in FIG. 4 subsequent to transmitting the first alarm 221 to determine whether a call-back is received from the key mobile device 30, and then proceeds to Step 150 if the call-back is not received. In Step 150, it is determined whether there is a change in exceeding predetermined criteria for any one of received signal strength indicator (RSSI) regarding radio waves received from the sensor transmitters 2a through 2d.

A strength variation reference value, which is configured to compare the absolute value of variation amount in received signal strength of a radio wave (i.e., a radio wave including information of air pressure) received at the present (that is, the newest radio wave) with the received signal strength of the radio wave (i.e., a radio wave including information of air pressure) received previously, is adopted as predetermined criteria. More specifically, a strength variation reference value is configured in advance such that the absolute value of the variation amount at the time of removing the tire from the vehicle for stealing a tire exceeds the strength variation reference value.

Regardless of the sensor transmitters 2a through 2d, when the absolute value regarding difference between received signal strength of a radio wave received previously by the door-control vehicular device 4 from the identical sensor transmitters and the received signal strength of a radio wave received currently is equal to or less than the strength variation reference value, the door-control vehicular device 4 determines that there is no variation in Step 150 and proceeds to Step 160.

In Step 160, it is determined whether a predetermined period (for example, it may be one minute, five minutes or ten minutes) has been elapsed from the time of transmitting the first alarm 221 transmitted at final, and the processing proceeds to Step 140 in a case where the predetermined period has not elapsed.

Accordingly, the door-control vehicular device 4 repeats Steps 140, 150 and 160 in order during a period where a call-back is not received after transmitting the first alarm 221; there is no change such that the received strength from any one of the sensor transmitters 2a through 2d exceeds the strength variation reference value; and a predetermined period has not elapsed from the time of transmitting the first alarm 221.

In the present example, a user performs a predetermined call-back operation 225 on the key mobile device 30 before a predetermined period 30 has elapsed from the transmission of the first alarm 221. The call-back operation 225 herein may be, for example, a press-down operation of a button used for a call-back operation attached to the key mobile device 30, or may be a simultaneous press-down operation of a door-locking button and a door-unlocking button attached to the key mobile device 30.

The key mobile device 30 transmits a predetermined call-back 227 by a radio wave based on having the call-back operation 225. A transmission unit used for transmission of the call-back may use the one identical to the transmission unit for transmitting the door-locking signal and the door-unlocking signal or an answer signal, or alternatively may use the one different from the transmission unit described above. When the same transmission unit is used, a frequency of a radio wave including a modulation method and signal regarding a call-back is similar to a door-locking signal and a door-unlocking signal or an answer signal.

The door-control vehicular device 4, which directly receives a radio wave including the call-back before the predetermined period 30 has elapsed from the time of transmitting the first alarm 221, determines that there is a call-back and proceeds to Step 180.

All-clear is carried out in Step 180 (i.e., Step 229 in FIG. 6), and processing returns to Step 105. In this way, the door-control vehicular device 4 receives a call-back from the key mobile device 30 before a predetermined period has elapsed from the time of transmitting the first alarm 221 and at the time where there is no variation that exceeds the strength variation reference value in the reception strength from any one of the sensor transmitters 2a through 2d, and all-clear is carried out without transmitting a request of the after-mentioned second alarm.

By this means, the reception of a call-back within a predetermined period makes a user notice warning notification based on a first alarm. With regard to the case where the first alarm 221 is sent due to the above-mentioned behaviors (i.e., removing air from a tire or jack-up) done by a tire thief, it is not necessary to transmit a second alarm to the destination of a remote location since the user immediately goes to the location of the vehicle 10 for confirming the cause of the warning notification. In addition, with regard to the case where the first alarm 221 is transmitted due to working such as car washing done by a user himself or herself, since it is obvious that this case is not tire theft, it is not required to transmit a second alarm to the transmission destination located at a remote place. When the second alarm is transmitted to the transmission destination located at a remote place, it is common that, for example, telecommunication fee and service fee are required. Therefore, without transmitting an unnecessary second alarm, the spending on telecommunication fee and service fee can be reduced.

Next, the second operation example after the key mobile device 30 receiving the first alarm 221 and carrying out warning notification (Step 223) is described with reference to FIG. 7.

First, the door-control vehicular device 4 transmits the first alarm 221, and then Steps 140, 150 and 160 are repeated in order in a period where a call-back is not received; where there is no variation over the strength variation reference value for the reception strength from any one of the sensor transmitters 2a through 2d; and where a predetermined period has not elapsed from the time of transmitting the first alarm 221.

According to this example, there is a variation that exceeds predetermined criteria in the reception signal strength intensity (RSSI) of a radio wave received from one of the sensor transmitters 2a through 2d before the predetermined period 30 has elapsed from the transmission of the first alarm 221.

In particular, the door-control vehicular device 4 receives tire air pressure 231, 233, 235, 237 by radio waves periodically from the sensor transmitters 2a through 2d respectively after transmitting the first alarm 221. However, as comparing the previous reception signal strength intensity of the radio wave of the tire air pressure 235 with the latest (i.e., current) reception signal strength intensity of the radio wave of the tire air pressure 237, the absolute value of variation amount regarding the latter one against the previous one is supposed to exceed the strength variation reference value.

This kind of situation is caused by, for example, removing the first one of four tires targeted by a tire thief.

In this case, the door-control vehicular device 4 determines that there is a variation in the signal reception strength in Step 150 in FIG. 4 (corresponding to Step 239 in FIG. 7) and then proceeds to Step 170. In Step 170, a request 241, which is for transmitting a second alarm to a remote place as a transmission destination, is outputted to the broadband communication device 5. The broadband communication device 5 for receiving the request 241 transmits the second alarm to a predetermined remote place as the transmission destination (at Step 243).

For example, when the center 33 as the transmission destination is registered in the broadband communication device 5 in advance, the broadband communication device 5 transmits the second alarm to the center 33 connected to the communication network 32 by wirelessly connecting to the nearest base station 31 (at Step 243). The second alarm may include identification information of the vehicle 10 (i.e., information of number plate or the like) and positional information of the vehicle 10. The positional information of the vehicle 10 may be obtained from, for example, a GPS receiver mounted on the vehicle.

With regard to the center 33 which receives the second alarm, the center 33 automatically issues a notification of having tire theft to a security company or the like; or alternatively, the operator of the center 33 uses a telephone or the like to issue a notification of having tire theft to a security company or the like. The notification also includes identification information and positional information of the vehicle 10. As the security company, which receives the notification, carries out an operation on tire theft, the damage caused by tire theft can be prevented beforehand, or the damage may be minimized. Additionally, for example, when the user terminal 35, which is owned by the user of the vehicle 10, as the transmission destination is registered into the broadband communication device 5 in advance, the broadband communication device 5 wirelessly connects to the nearest base station 31 so that the second alarm identical to the above is transmitted by, for example, an E-mail to the user terminal 35 within the communication range of the base station 34 through the base station 34 connected to the communication network 32 (at Step 243).

The user terminal, which receives the second alarm, displays the content of the second alarm to the user and issues a notification of having tire theft to the user. The user who receives the notification carries out an action on tire theft to prevent the damage caused by tire theft or at least to minimize the damage.

It is noted that the first alarm is received through the key mobile device 30 in the second operation example; however, the operations of the door-control vehicular device 4 and the broadband communication device 5 do not change even if the first alarm does not reach the key mobile device 30.

Figure 8:
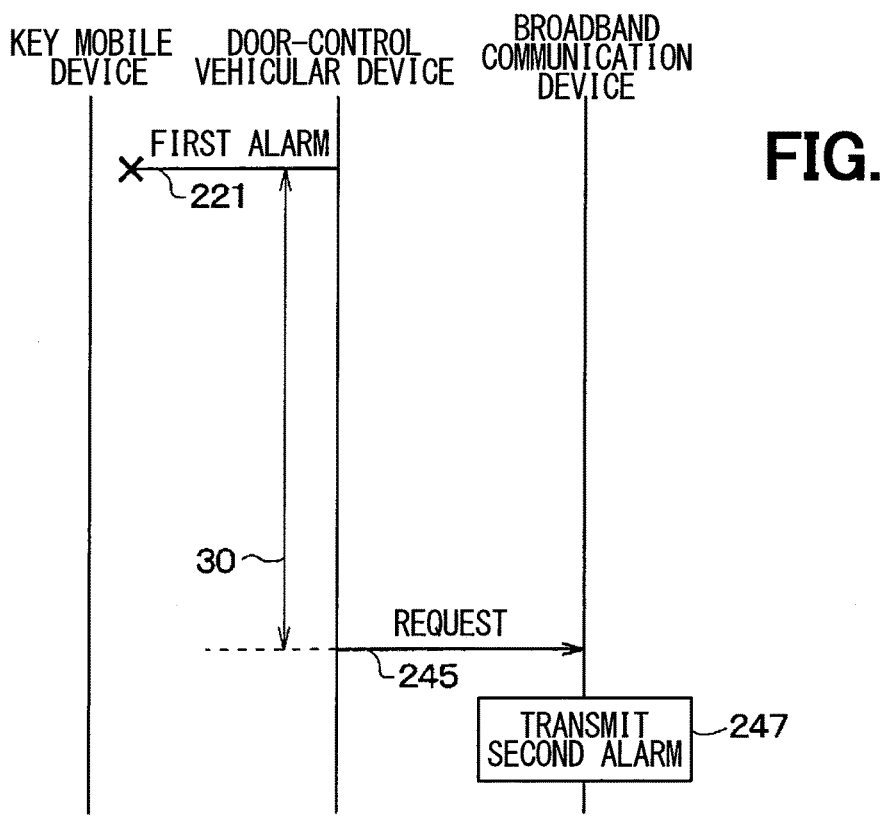
FIG. 8 It is a sequence diagram that shows the operation performed by the tire theft alarm system.

Next, the third operation example, which is subsequent to the key-mobile device 30 receiving the first alarm 221 and carrying out an alarm notification (at Step 223), is described with reference to FIG. 8.

Initially, subsequent to the transmission of the first alarm 221 performed by the door-control vehicular device 4, the door-control vehicular device 4 repeats Step 140, 150, 160 in order in a period where a call-back is not received; where there is no variation that exceeds the strength variation reference value in the reception strength from any of the sensor transmitters 2a through 2d; and where a predetermined period has not been elapsed from the time of transmission of the first alarm 221.

In the present example, a call-back is not received; there is no variation that exceeds the strength variation reference value in the reception strength from any of the sensor transmitters 2a through 2d; and the predetermined period 30 has elapsed after the transmission of the first alarm 221.

In this situation, it is considered that the user who carries the key mobile device 30 is at a location (for example, the commuting destination of a user in a case where the vehicle 10 is in the user's residence) farther from the vehicle 10; and there is no variation of the signal reception strength within the predetermined period 30 as a result of the time required for a thief to remove a tire from a vehicle body, or a tire is removed without the signal strength intensity being changed. In this situation, the first alarm does not reach the key mobile device 30 and there is no variation that exceeds the strength variation reference value in the reception strength while a predetermined period has been elapsed from the transmission of the first alarm 221.

In this case, the door-control vehicular device 4 determines that a predetermined period has elapsed from the transmission of the first alarm and proceeds to Step 170. In Step 170, a request 245, which is for transmitting the second alarm to a remote location as the transmission location, is outputted to the broadband communication device 5. The broadband communication device 5 receiving the request 241 transmits the second alarm to a remote location as the transmission location (at Step 247). The particular method for transmitting the second alarm is identical to Step 243 in the second operation example. Therefore, it is identical to the second operation example that damage caused by tire theft can be prevented in advance, or at least the damage may be minimized.

As described above, in the present embodiment, the second alarm is transmitted to the center 33 or the user terminal 35 at a remote location in a case where the first alarm is transmitted to the key mobile device 30 based on having a variation on the air pressure and acceleration of a tire and subsequently there is a variation in the reception signal strength intensity from the sensor transmitters 2a through 2d; or in a case where there is no call-back within the predetermined period 30 where there is no variation in the reception signal strength intensity provided from the sensor transmitters 2a through 2d.

On this issue, with regard to the technique (see JP 4144521) of monitoring only a variation in the reception signal strength intensity provided from the sensor transmitters 2a through 2d, an alarm is issued to the user at the time of a tire being removed from a vehicle so that theft cannot be prevented in advance since at least one tire has already be stolen.

The present embodiment determines that a tire may be stolen in a case where there is a change in the air pressure and acceleration of a tire from a parking initial state by, for example, jacking-up the vehicle 10 and removing a tire's air by putting a block or the like under the vehicle by means of switching the reception destination of data provided from the sensor transmitters 2a through 2b to the door-control vehicular device 4 to be in a usual waiting state under a warning state, and uses the door-control vehicular device 4 to issue a first alarm as a theft sign. Accordingly, the initial movement of a user becomes earlier. In addition, it is possible to reduce commission fee since the broadband communication device 5 is not used suddenly.

(Embodiment 2)

Figure 9:
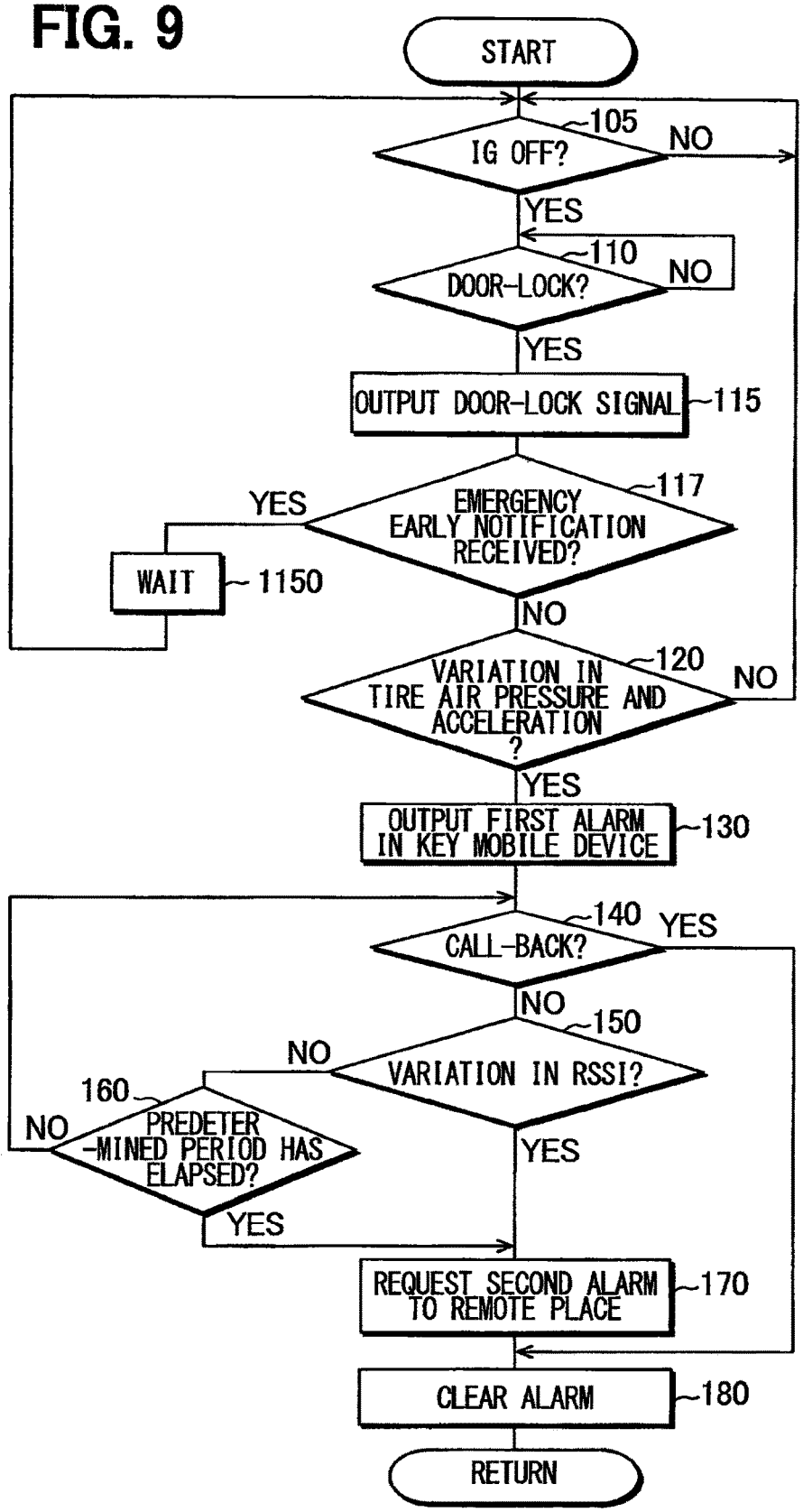
FIG. 9 It is a flowchart that shows processing executed by a door-control vehicular device according to Embodiment 2.

Embodiment 2 of the present disclosure is described in the following section. The present embodiment is different from Embodiment 1 in that the door-control vehicular device 4 carries out processing illustrated in FIG. 9 instead of processing illustrated in FIG. 4. It is noted that the steps appended by the identical numerical reference in FIGS. 4 and 9 carry out identical processing. Therefore, the descriptions of these steps are omitted or simplified herein.

The operation of the door-control vehicular device 4 in the present embodiment is different from Embodiment 1 in one respect. After a door-locking is outputted in Step 115, it is determined whether earthquake early warning in Step 117 is received. The earthquake early warning is early warning that notifies of an earthquake (or the main movement of an earthquake) to a user in advance, therefore, the earthquake early warning is set to be receivable by the broadband communication device 5. The broadband communication device 5 receives the emergency earthquake early warning and issues the reception of the emergency earthquake early warning to the door-control vehicular device 4. The door-control vehicular device 4 determines the presence or absence of the reception of the emergency earthquake early warning, depending upon whether the notification is received.

When it is determined that the emergency earthquake early warning is not received in Step 117, the processing proceeds to Step 120. Accordingly, the determination of Steps 105, 110, 115, 117, and 120 is repeated in a period where it is in a warning state and it is determined that an emergency earthquake early warning is not received and having no variation in Step 120. The operation subsequent to the determination of having a variation in Step 120 is identical to the one in Embodiment 1.

When it is determined that an emergency earthquake early warning is received in Step 117, the processing proceeds to Step 1150, and processing is in an idle state in Step 1150 in a period where a predetermined waiting period (for example five minutes) has been elapsed from the reception of the emergency earthquake early warning. Accordingly, even if there is a variation in the air pressure or acceleration of a tire within the predetermined waiting period, the transmission of a first warning in Step 130 is restricted since Step 120 is not executed.

Therefore, even though there is a variation in the air pressure or acceleration of a tire caused by vibration due to an earthquake, the nuisance felt by a user who receives unnecessary warning notification can be reduced. In addition, since a second warning is not transmitted either, unnecessary communication fee can be reduced.

(Embodiment 3)

Embodiment 3 of the present disclosure is described in the following section. The present embodiment is an alternation of a part of Embodiments 1 and 2. The present embodiment is different from Embodiments 1 and 2 in that the TPMS vehicular device 3 has no wireless transmission function, and consequently the sensor transmitters 2a through 2d have no function for transmitting the notification of IG in an OFF state.

Thus, the sensor transmitters 2a through 2d do not receive a notification of IG in an OFF state, the incoming of timing of switching the transmission destination of a frame having air pressure and acceleration is detected based on the air pressure and acceleration of a tire detected by the sensor transmitters 2a through 2d.

The following section describes the differences between the present embodiment and Embodiments 1 and 2 in detail. The present embodiment configured by hardware is different from Embodiments 1 and 2 in that the TPMS vehicular device 3 does not have a wireless transmission unit for transmitting a notification of IG in an OFF state to the sensor transmitters 2a through 2d.

The operations carried out by the devices other than the sensor transmitters 2a through 2d and the TPMS vehicular device 3 are similar to the one in Embodiments 1 and 2.

The operation of the TPMS vehicular device 3 is merely different from the one in Embodiments 1 and 2 in that, when it is determined that a door-locking signal is received in Step 320, the processing in FIG. 3 proceeds to Step 340 without performing Step 330, and the operation is terminated (at Step 207 in FIG. 7).

With regard to the operation carried out by each of the sensor transmitters 2a through 2d, it is identical to the operation in Embodiments 1 and 2 that the air pressure and acceleration of the tires 1a through 1d to be mounted are detected, and a signal indicative of the latest detection value (a frame including the detected newest air pressure and acceleration) is periodically transmitted to the TPMS vehicular device 3 or the door-control vehicular device 4.

However, the control for switching the transmission destination of a frame is different from the one in Embodiments 1 and 2. The processing indicated in the flowcharts of FIGS. 10 and 11 achieves the switching of the transmission destination for a frame.

Figure 6:
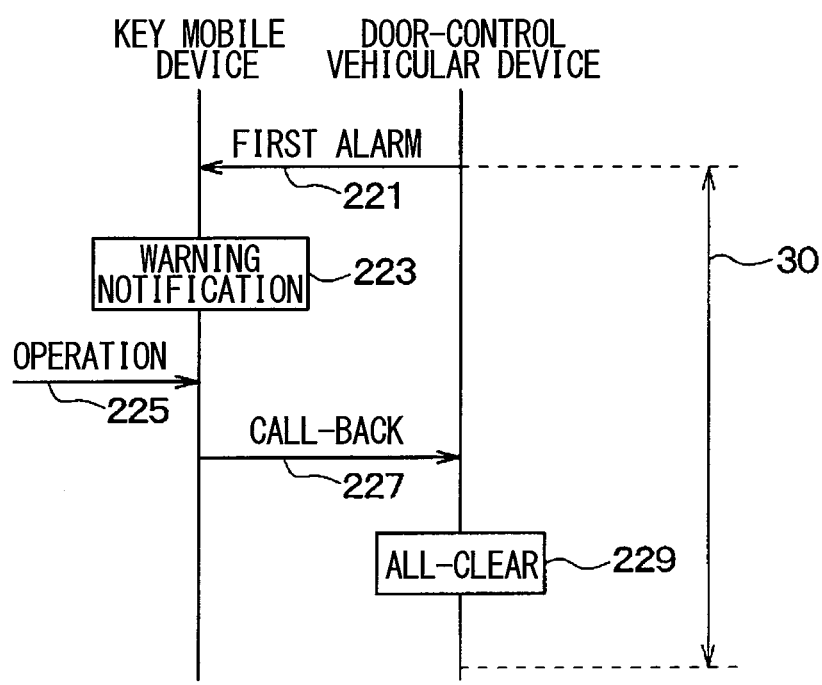
FIG. 6 It is a sequence diagram that shows the operation performed by the tire theft alarm system.
Figure 12:
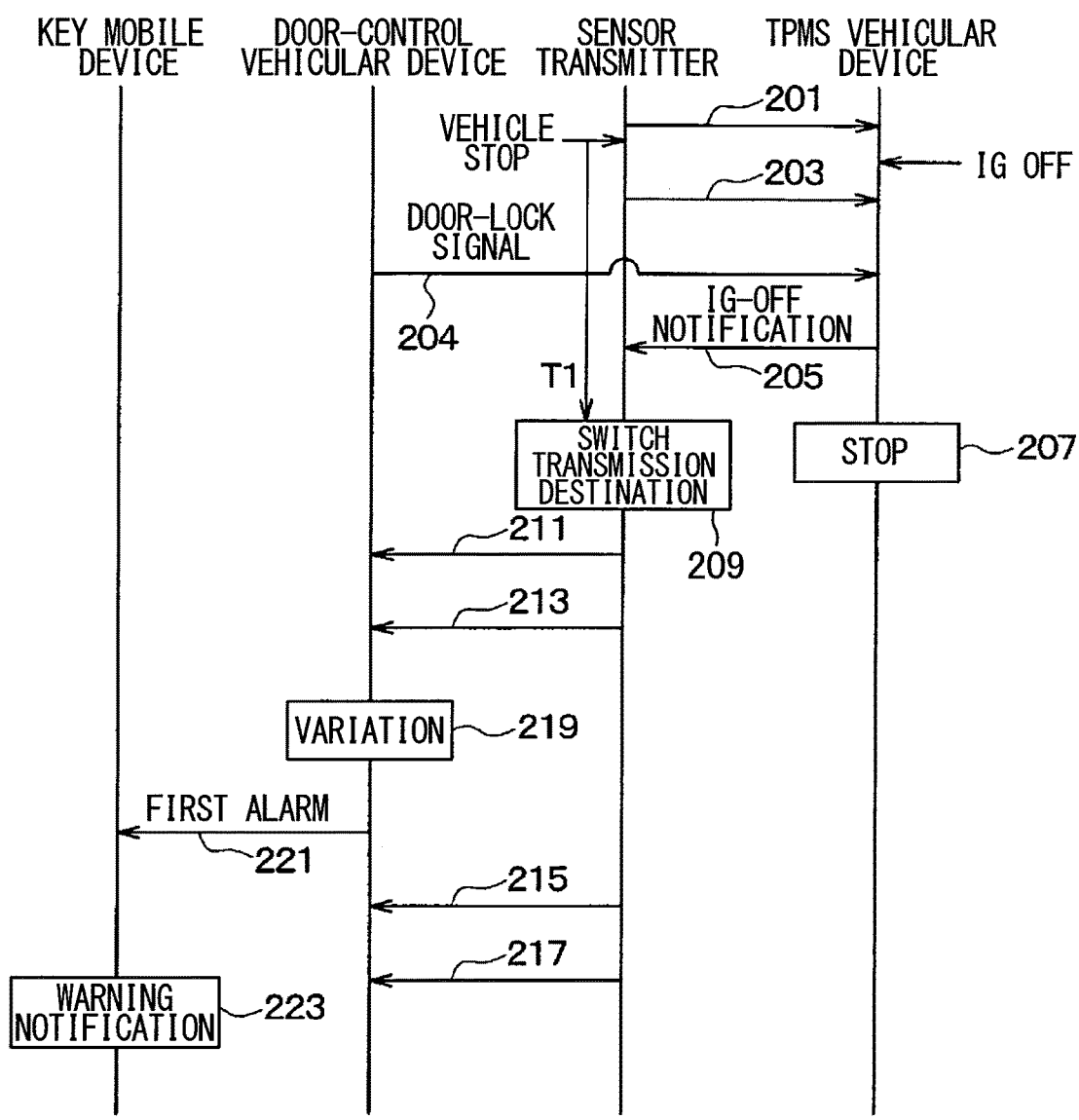
FIG. 12 It is a sequential diagram that shows an operation performed by a tire theft alarm system according to the Embodiment 3.

The following section describes the operation of the whole tire theft alarm system and the parts which are different from Embodiments 1 and 2. The operation shown in FIG. 12 is an alternative to the operation shown in FIG. 5. It is noted that the operations shown in FIGS. 6 through 8 are executed also in the present embodiment in the same way. The following section describes the operation shown in FIG. 12 which is different from the operation shown in FIG. 5.

Figure 10:
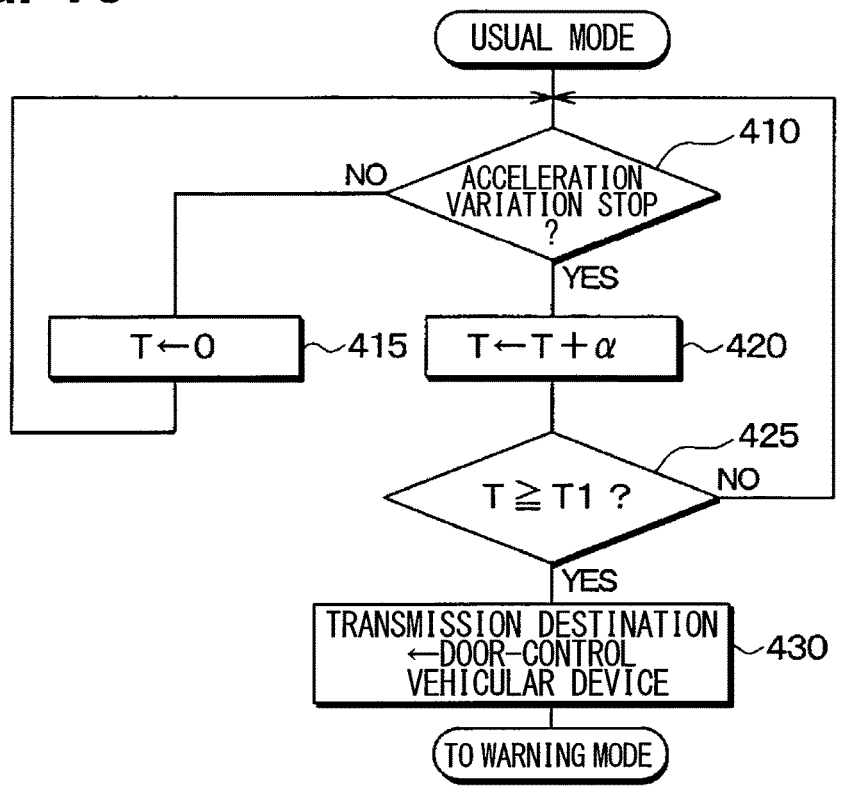
FIG. 10 It is a flowchart that shows processing executed by a control unit of a sensor transmitter in a usual mode in Embodiment 3.

First, the control unit 23 in each of the sensor transmitters 2a through 2d executes processing shown in FIG. 10 in a normal mode, and determines whether the acceleration change is stopping in Step 410.

Specifically, a maximum value and a minimum value of the detected acceleration for a past several times (for example, two times) including the latest acceleration value detected by the acceleration sensor 22 are extracted. If the difference between the maximum value and the minimum value is less than predetermined threshold acceleration (for example, acceleration identical to gravity acceleration), it is determined that the acceleration change stops. Otherwise, it is determined that the acceleration change has not been stopped.

In a case where the acceleration change has not been stopped, the processing proceeds to Step 415 and resets the value of time variable T to zero, and then returns to Step 410. Accordingly, the processing in Steps 410 and 415 is repeated before a vehicle stops. Meanwhile, the control unit 23 detects air pressure and acceleration of the tires 1a through 1*d* to be mounted and uses the first communication unit 24 and the first antenna 25 to transmit a signal (for example, the signal 201) indicative of a latest detection value (i.e., air pressure and acceleration) periodically.

It is noted that only one of the sensor transmitters 2*a* through 2*d* is described for simplicity, however, the operations performed by other sensor transmitters are basically identical.

The TPMS vehicular device 3 carries out display control of air pressure of tires 1*a* through 1*d* based on the detected signal corresponding to the air pressure and acceleration of a tire (for example, the signal 201).

In the processing illustrated in FIG. 3, the TPMS vehicular device 3 at this time determines IG not in an OFF state (i.e., in an ON state) based on the voltage at an IG signal line (not shown) in Step 310, and consequently repeats determination processing in Step 310.

The door-control vehicular device 4 at this time determines that IG is not in an OFF state based on the voltage at the IG signal line (not shown), and consequently repeats determination processing in Step 105.

Subsequently, the vehicle is supposed to stop. Since there is no change in acceleration detected by the acceleration sensor 22, the control unit 23 in the sensor transmitters 2*a* through 2*d* determines that the acceleration change stops in Step 410 and proceeds to Step 420.

In Step 420, the value of time variable T is increased by only a specified amount α. The specified amount α corresponds to the cycle repeated in Step 420 in a case where Steps 410, 420, 425 are repeated in the order.

Next in Step 425, it is determined whether the time variable T is equal to or larger than the predetermined time T1, the processing returns to Step 410 when the time variable T is equal to or larger than the predetermined time T1. The control unit 23 repeats Steps 410, 420 and 425 in a period where the vehicle is kept stopped. As a result, the time variable T increases in synchronization with the elapsed time since the acceleration has not been changing initially.

Subsequently, when IG is in an OFF state, the TPMS vehicular device 3 determines that IG is in an OFF state in the processing illustrated in FIG. 3 based on the voltage at the IG signal line (not shown) and proceeds to Step 320, and then determines that a door-locking signal is not received and repeats the processing in Step 320.

The door-control vehicular device 4 at this time determines that IG is not in an OFF state based on the voltage at the IG signal line (not shown) in Step 105, and consequently proceeds to Step 110, and then repeats Step 110 when it is determined that the door-locking is not carried out.

After IG is turned into an OFF state, the door of the vehicle 10 is locked. The door-control vehicular device 4 then detects the door is locked, and proceeds to Step 115 after determining that the door is locked in Step 110. Next in Step 115, the door-locking signal 204 is outputted to the TPMS vehicular device 3 and moves to a warning state, and the processing moves to Step 120.

The TPMS vehicular device 3 receiving the door-locking signal 204 determines that a door-locking signal is received in Step 320, and bypasses Step 330 and proceeds to Step 340. Then, the operation stops in Step 340 (corresponding to Step 207 in FIG. 5).

Subsequently, with each control unit 23 in the sensor transmitters 2*a* through 2*d*, the time variable T increased by repeating Step 420 is equal to or larger than the predetermined time T1 (for example, 5 minutes). Thus, the control unit 23 determines that the time variable T is equal to or larger than T1 in Step 425 and proceeds to Step 430. In this way, the control unit 23 determines that the vehicle stops based on that the acceleration has been stopped over than the predetermined period T1.

Next in Step 430, the control unit 23 in each of the sensor transmitters 2*a* through 2*b* switches the transmission destination of a frame including the detected tire's air pressure and acceleration from the TPMS vehicular device 3 to the door-control vehicular device 4 by means of performing transmission-destination switching processing (at Step 209). The particular method for switching is described in Embodiment 1. The control unit moves to a warning mode subsequent to Step 430 and starts to execute the processing in FIG. 11.

Therefore, subsequent to switching (that is, at the time of an alarming mode), the second communication unit 25 wirelessly transmits a signal corresponding to the frame (for example, the later-mentioned signals 211, 213, 215, 217) to the door-control vehicular device 4 but not the TPMS vehicular device 3. Further operations in FIG. 5 are as described in Embodiment 1.

Figure 11:
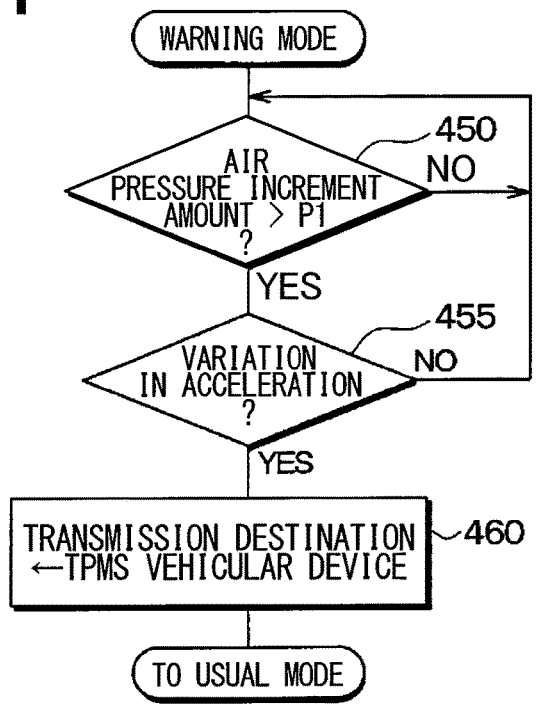
FIG. 11 It is a flowchart that shows processing executed by the control unit of the sensor transmitter in a warning mode in the Embodiment 3.

This section describes processing in which the control unit 23 in each of the sensor transmitters 2*a* through 2*d* changes a warning mode back to a usual mode. First, it is determined whether the air pressure variation amount exceeds a predetermined threshold amount P1 in Step 410 as shown in FIG. 11 in a warning mode.

The air-pressure increment amount is an increasing amount of a latest air pressure value detected by the air-pressure sensor 21 relative to a reference air-pressure value. A detection value of air pressure right before or right after the transition from a usual mode to a warning mode is adopted as reference air pressure. It is determined whether a person boards the vehicle depending on whether the air-pressure increment amount exceeds the predetermined threshold amount P1.

In a period where a person does not board the vehicle, the air-pressure increment amount does not exceed the threshold amount P1 and the processing in Step 450 is repeated. Subsequently, when a person boards on the vehicle, it is determined that the air-pressure increment amount exceeds the threshold amount P1 in Step 450 and the processing moves to Step 455.

It is determined whether there is a variation in the acceleration in Step 455. Specifically, a maximum value and a minimum value of the detected acceleration for a past several times (for example, two times) including the latest acceleration value detected by the acceleration sensor 22 are extracted. If the difference between the maximum value and the minimum value is less than predetermined threshold acceleration (for example, acceleration identical to gravity acceleration), it is determined that the acceleration change stops. Otherwise, it is determined that the acceleration change has not been stopped, and the processing returns to Step 450. When the vehicle does not start to travel even if a person boards the vehicle, since it is determined that there is no variation in the acceleration in Step 455, the processing in Steps 450, 455 is repeated.

Subsequently, when the vehicle starts travelling, since it is determined that the air-pressure increment amount exceeds the threshold amount P1 in Step 450 and there is a variation in the acceleration in Step 455, the processing proceeds to Step 460.

Next in Step 460, the control unit 23 in each of the sensor transmitters 2*a* through 2*b* switches the transmission destination of a frame including the detected air pressure and acceleration of a tire from the TPMS vehicular device 3 to the door-control onboard device 4 by means of carrying out transmission-destination switching processing. Subsequently, the control unit 23 returns to a usual mode and starts the processing in FIG. 10.

The particular method for switching the transmission destination in Step 460 is achieved by switching the output destination of a frame including information of tire air pressure and information of acceleration from the second communication unit 25 to the first communication unit 24. Accordingly, subsequent to switching, the first communication unit 24 wirelessly transmits a signal corresponding to the frame to the TPMS vehicular device 3 but not the door-control vehicular device 4.

The content of a frame to be outputted is also changed to a frame format for the TPMS vehicular device 3.

(Modification)

It is noted that the present disclosure is not only restricted to the above embodiments but also can be modified within the scope of claims. In addition, the above embodiments are not necessarily in a mutually independent manner, it is possible to making combination except the case where combination is deemed to be impossible. In addition, with regard to each of the embodiments, the elements for configuring an embodiment are not necessarily required except the case where the elements are indicated to be particularly required and are considered to be apparently required in principle. Moreover, with regard to the numerical value regarding number of component(s), numerical value, amount and range for a component configured in the embodiment, if it is referred to in the embodiments, the specified number for the component is not restricted except the case where the number is indicated to be particularly required and is consider to be restricted into a specified number required in principle. Furthermore, when it is referred that, for example, the shape and positional relationship for an element in the embodiments, the shape and positional relationship of the element are not necessarily restricted except the case where it is indicated to be particularly required and is considered to be required in principle.

In the above embodiments, the ON and OFF of IG corresponding to the vehicle 10 travelled by power of an engine as an internal combustion is listed as an example of ON and OFF of a main power supply of the vehicle. However, when the vehicle 10 is an electric car travelled by power of an electric motor, ON and OFF of the main power supply of the vehicle may not be ON and OFF of IG.

According to the above embodiments, the door-control vehicular device 4 proceeds to Step 130 in a case where the absolute value of difference between air pressure currently received by the door-control vehicular device 4 and the reference air pressure exceeds the air-pressure variation reference value; and in a case where the absolute value of difference between the acceleration received currently by the door-control vehicular device 4 and the reference acceleration value exceeds the acceleration variation reference value.

However, it is not necessarily to be restricted in the above situation. For example, in Step 120 illustrated in FIG. 4, the door-control vehicular device 4 proceeds to Step 130 in a case where the absolute value of difference between the air pressure currently received by the door-control vehicular device 4 and the reference air pressure exceeds the air pressure variation reference value; or in a case where the absolute value of difference between the acceleration currently received by the door-control vehicular device 4 and the reference acceleration exceeds the acceleration variation reference value. Otherwise, the door-control vehicular device 4 may be configured to return to Step 105.

The above embodiments exemplify the key mobile device 30 such as a smart key and RKE key as an example of mobile device. However, the mobile device of the present disclosure is not restricted to perform door-locking and door-unlocking for a vehicle, it may be, for example, a mobile device such as a mobile phone device and PDA.

What is claimed is:

1. A tire theft alarming system, comprising: a vehicular device mounted on a vehicle;
a sensor transmitter that detects and transmits an air pressure of a tire mounted to the vehicle or an acceleration applied to the tire; and a mobile device carried by a user of the vehicle, wherein the vehicular device includes:
a TPMS vehicular device that controls a display corresponding to the air pressure of the tire received from the sensor transmitter when a main power supply is in an ON state and stops an operation when the main power supply is in an OFF state; and
a door-control vehicular device that controls door-locking and door-unlocking for the vehicle by at least communicating with the mobile device when the main power supply is in an OFF state,
wherein the sensor transmitter switches a transmission destination, to which the detected air pressure of the tire or the detected acceleration is transmitted from the sensor transmitter, from the door-control vehicular device to the TPMS vehicular device, when the main power supply is switched to the ON state from the OFF state,
wherein the sensor transmitter transmits the detected air pressure of the tire or the detected acceleration to the TPMS vehicular device when the main power supply is in an ON state,
wherein the sensor transmitter switches the transmission destination from the TPMS vehicular device to the door-control vehicular device, when the main power supply is switched to the OFF state from the ON state,
wherein the sensor transmitter transmits the detected air pressure of the tire or
the detected acceleration to the door-control vehicular device when the main power supply is in an OFF state,
wherein, when a main power supply of the vehicle is in an OFF state, the door-control vehicular device transmits a radio wave including a first alarm to the mobile device based on a variation in the air pressure or the acceleration of the tire, detected by the sensor transmitter, and
wherein the mobile device carries out a warning notification to the user based on receiving the radio wave including the first alarm transmitted by the door-control vehicular device.

2. The tire theft alarming system according to claim 1, wherein, after the door-control vehicular device transmits the first alarm by a radio wave, and the door-control vehicular device controls a broadband device, which is mounted to the vehicle, to transmit a second alarm to a predetermined destination outside of a transmission range of the first alarm by outputting a request to the broadband device based on a variation in reception power intensity from the sensor transmitter.

3. The tire theft alarming system according to claim 1, wherein, after the mobile device carries out the warning notification to the user based on receiving the radio wave transmitted by the mobile device, and the mobile device transmits a call-back to the door-control vehicular device based on receiving a predetermined operation from the user, and wherein the door-control vehicular device outputs a request to a broadband communication device mounted to the vehicle based on having no reception of the call-back in a period where another predetermined period has elapsed from transmitting the first alarm so that the broadband communication device transmits a second alarm to a predetermined destination outside of a transmission range of the first alarm, and wherein the door-control vehicular device does not output the request to the broadband communication device based on having reception of the call-back in a period where the predetermined period has elapsed from transmitting the first alarm.

4. The tire theft alarming system according to claim 1, wherein the door-control vehicular device prohibits transmission of the first alarm in a predetermined waiting period right after receiving an emergency earthquake early notification.

5. The tire theft alarming system according to claim 1, wherein:

the door-control vehicular device transmits a door-locking signal to the TPMS vehicular device when a door of the vehicle is locked;

the TPMS vehicular device transmits an OFF-state notification signal to the sensor transmitter when the TPMS vehicular device receives the door-locking signal; and the sensor transmitter switches the transmission destination from the TPMS vehicular device to the door-control vehicular device when the sensor transmitter receives the OFF-state notification signal.

6. The tire theft alarming system according to claim 1, wherein the sensor transmitter includes:

a first antenna that transmits information to the TPMS vehicular device; and a second antenna that transmits information to the door-control vehicular device.

7. A tire theft alarming system, comprising:

a vehicular device mounted on a vehicle; and a mobile device carried by a user of the vehicle, wherein, when a main power supply of the vehicle is in an OFF state, the vehicular device transmits a radio wave including a first alarm based on a variation in air pressure or acceleration of a tire, which is mounted to the vehicle, detected by a sensor transmitter for detecting and transmitting the air pressure of the tires or the acceleration applied to the tires, wherein the mobile device carries out a warning notification to the user based on receiving the radio wave including the first alarm transmitted by the vehicular device, and subsequently transmits a call-back to the vehicular device based on receiving a predetermined operation from the user, wherein the vehicular device outputs a request to a broadband communication device mounted to the vehicle based on having no reception of the call-back in a period where another predetermined period has elapsed from transmitting the first alarm so that the broadband communication device transmits a second alarm to a predetermined destination outside of a transmission range of the first alarm, and wherein the vehicular device does not output the request to the broadband communication device based on having reception of the call-back in a period where the predetermined period has elapsed from transmitting the first alarm.

* * * * *